US012599910B2

(12) United States Patent
Naga

(10) Patent No.: US 12,599,910 B2
(45) Date of Patent: Apr. 14, 2026

(54) CONFIGURABLE, COMPACT, MULTI-VARIANT RECYCLABLE MATERIAL FRAGMENTATION APPARATUS AND METHOD

(71) Applicant: Srinivasa Gopichand Attili Naga, Edison, NJ (US)

(72) Inventor: Srinivasa Gopichand Attili Naga, Edison, NJ (US)

(73) Assignee: SAVE PLANET LLC, Edison, NJ (US)

( * ) Notice: Subject to any disclaimer, the term of this patent is extended or adjusted under 35 U.S.C. 154(b) by 0 days.

(21) Appl. No.: 18/913,397

(22) Filed: Oct. 11, 2024

(65) Prior Publication Data

US 2026/0008062 A1 Jan. 8, 2026

Related U.S. Application Data

(62) Division of application No. 18/763,247, filed on Jul. 3, 2024, now abandoned.

(51) Int. Cl.

| | |
|---|---|
| ***B02C 18/14*** | (2006.01) |
| ***B02C 18/00*** | (2006.01) |
| ***B02C 18/22*** | (2006.01) |
| ***B02C 25/00*** | (2006.01) |

(52) U.S. Cl.
CPC ........ *B02C 18/142* (2013.01); *B02C 18/0092* (2013.01); *B02C 18/2216* (2013.01); *B02C 25/00* (2013.01); *B02C 2018/147* (2013.01)

(58) Field of Classification Search
CPC ............ B02C 2018/147; B02C 18/142; B02C 18/2216; B02C 25/00
See application file for complete search history.

(56) References Cited

U.S. PATENT DOCUMENTS

| | | | |
|---|---|---|---|
| 229,879 | A | 7/1880 | Frambach |
| 316,936 | A | 5/1885 | Beal |
| 1,024,168 | A | 4/1912 | Williams |

(Continued)

FOREIGN PATENT DOCUMENTS

| | | | |
|---|---|---|---|
| CH | 87339 | A | 11/1920 |
| CN | 108014873 | | 5/2018 |

(Continued)

*Primary Examiner* — Christopher L Templeton
*Assistant Examiner* — P Derek Pressley
(74) *Attorney, Agent, or Firm* — Walter J. Tencza, Jr.

(57) ABSTRACT

An apparatus for recycling material which includes: a housing; typically at least two levels of cutters each having at least two roller cutters, which may be configured to slide and create variable gap to accommodate materials of varying sizes. A weight sensor; a fill sensor; and a camera may be provided, wherein various data is transmitted to a central data hub enabling recycle bin pickup synchronization and determining quality of shredded materials. The roller cutters on different levels typically have a plurality of cutting blades, wherein the shape on each of the levels may be different. The first and second level are typically fixed to the housing and material shredded by the first level proceeds to second level which is then shredded by the second level before being discarded into recycle bin. Another level of at least two roller cutters with a different shape may be part of the apparatus.

1 Claim, 15 Drawing Sheets

(56) References Cited

U.S. PATENT DOCUMENTS

| | | | | | |
|---|---|---|---|---|---|
| 1,312,717 | A | | 8/1919 | Zoeller | |
| 2,414,855 | A | | 1/1947 | Cornell | |
| 2,622,855 | A | | 12/1952 | Kulp | |
| 3,504,621 | A | | 4/1970 | Qualheim | |
| 3,727,850 | A | | 4/1973 | Krigbaum | |
| 3,862,721 | A | * | 1/1975 | Flair | B02C 18/142 241/293 |
| 3,921,920 | A | | 11/1975 | Brocard | |
| 3,931,935 | A | | 1/1976 | Holman | |
| 4,081,143 | A | | 3/1978 | Johnson | |
| 4,374,573 | A | | 2/1983 | Rouse | |
| 4,607,800 | A | | 8/1986 | Barclay | |
| 4,684,070 | A | | 8/1987 | Dicky | |
| 4,684,071 | A | | 8/1987 | Dicky | |
| 5,205,495 | A | | 4/1993 | Garnier | |
| 5,312,052 | A | | 5/1994 | Dellekamp | |
| 5,358,187 | A | | 10/1994 | Ward | |
| 5,425,925 | A | | 6/1995 | Kline et al. | |
| 5,697,560 | A | | 12/1997 | Bennett | |
| 5,704,558 | A | * | 1/1998 | Arrott | B07B 7/01 241/47 |
| 5,746,378 | A | | 5/1998 | Beadle | |
| 5,890,424 | A | | 4/1999 | Deters | |
| 6,439,486 | B1 | | 8/2002 | Nitta | |
| 7,938,347 | B2 | | 5/2011 | Romanovich | |
| 9,480,989 | B1 | | 11/2016 | Chang | |
| 11,389,805 | B1 | | 7/2022 | Ebadian et al. | |
| 2007/0075168 | A1 | | 4/2007 | Rodriguez | |
| 2012/0247984 | A1 | | 10/2012 | Jansson | |
| 2015/0220418 | A1 | * | 8/2015 | Aries | H04W 4/70 705/305 |
| 2017/0246640 | A1 | | 8/2017 | Wagner | |
| 2020/0055057 | A1 | * | 2/2020 | Stahl | B02C 18/148 |
| 2020/0147617 | A1 | | 5/2020 | Atkinson | |
| 2022/0180501 | A1 | | 6/2022 | Perez et al. | |
| 2023/0285920 | A1 | | 9/2023 | Gorlitz et al. | |
| 2023/0311167 | A1 | * | 10/2023 | Ahmad | B02C 18/0092 241/24.28 |

FOREIGN PATENT DOCUMENTS

| | | | | | |
|---|---|---|---|---|---|
| CN | 108273613 | A | | 7/2018 | |
| CN | 109569785 | A | | 4/2019 | |
| CN | 110201763 | A | * | 9/2019 | B02C 18/0007 |
| CN | 113368981 | A | * | 9/2021 | B02C 18/142 |
| DE | 3723038 | A | | 1/1989 | |
| EP | 1334771 | A1 | | 8/2003 | |
| EP | 4215278 | A2 | * | 7/2023 | B02C 18/142 |
| GB | 750535 | A | * | 6/1956 | |
| GB | 2161594 | A | * | 1/1986 | F21S 2/00 |
| JP | 06106088 | A | | 4/1994 | |
| JP | 08215596 | A | | 8/1996 | |
| JP | H11151451 | A | | 6/1999 | |
| JP | 3359177 | | | 12/2002 | |
| JP | 3359177 | B2 | | 12/2002 | |
| WO | WO-2021191834 | A1 | * | 9/2021 | B02C 18/0084 |

* cited by examiner

1100a 1135
1133
1134
1131
1129
1128
1127
1126
1125
1126
1124
1122
1123
1121
1120
1119

CONFIGURABLE, COMPACT, MULTI-VARIANT RECYCLABLE MATERIAL FRAGMENTATION APPARATUS AND METHOD

CROSS REFERENCE TO RELATED APPLICATION(S)

The present application is a divisional of and claims the priority of U.S. patent application Ser. No. 18/763,247, filed Jul. 3, 2024 inventor and applicant SRINIVASA GOPICHAND ATTILI NAGA.

FIELD OF THE INVENTION

This invention relates to devices for recycling materials.

BACKGROUND OF THE INVENTION

There are various devices known in the art for recycling materials.

SUMMARY OF THE INVENTION

In at least one embodiment, an apparatus for recycling material is provided which includes: a housing; a first level including at least two roller cutters; and a second level including at least two roller cutters. In at least one embodiment, the at least two roller cutters of the first level have a plurality of cutting blades of the same first shape; the at least two roller cutters of the second level have a plurality of cutting blades of the same second shape; and the first shape and the second shape are different. In at least one embodiment, the first level and the second level are fixed to the housing so that a first material travels into the first level and is shredded by the first level forming a first shredded material, and then the first shredded material next proceeds to the second level, and is shredded by the second level to form a second shredded material.

The apparatus may further include a third level including at least two roller cutters; wherein the at least two roller cutters of the second level have a plurality of cutting blades of the same third shape, which is different from the first and the second shapes; and wherein the third level is fixed to the housing so that the second shredded material comes from the second level and next proceeds to the third level and is shredded by the third level to form a third shredded material.

The apparatus may further include a recycle bin which is connected to the housing so that the second shredded material falls into the recycle bin after proceeding from the second level. The apparatus may further include: a fill sensor which measures height of the second shredded material in the recycle bin; a weight sensor which measures the weight of the second shredded material in the recycle bin; a camera which captures images of the second shredded material in the recycle bin; and a computer processor which is connected by communications links to the fill sensor, the weight sensor and/or the camera.

The computer processor is typically programmed to receive data concerning height of the second shredded material from the fill sensor, data concerning weight of the second shredded material from the weight sensor, and images of the second shredded material from the camera to determine its quality.

In at least one embodiment a method is provided of shredding a first material into a first shredded material using an apparatus; and then shredding the first shredded material into a second shredded material using the apparatus; wherein the apparatus may be configured as previously described. The method may further include shredding the second shredded material into a third shredded material.

DETAILED DESCRIPTION OF THE INVENTION

Figure 1A:
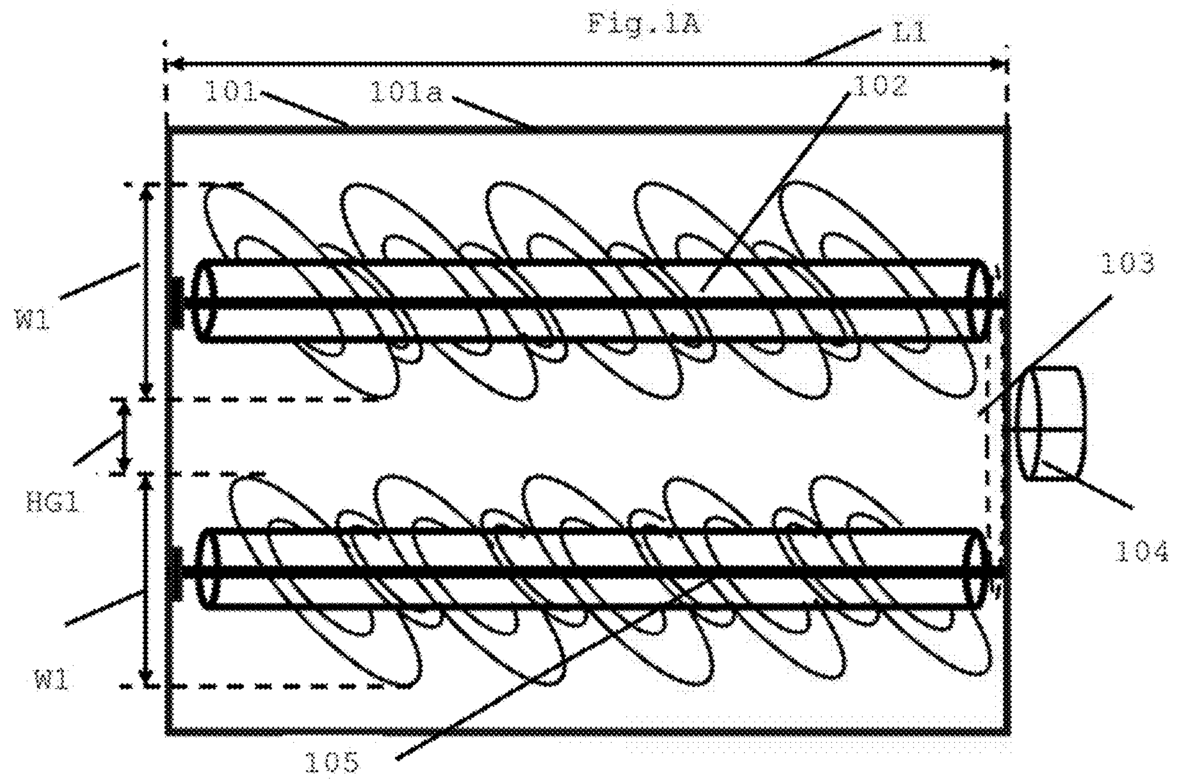
FIG. 1A shows a simplified top view sketch of a first level of a first cutting unit and a first motor, wherein the first level of the first cutting unit has two circular-angular roller cutters/shredders, in accordance with an embodiment of the present invention.

FIG. 1A shows a simplified top view sketch of a first level or layer 101*a* of a first cutting unit 100 (shown in FIG. 3), with two circular-angular roller cutters/shredders 102 and 105. The first level 101*a* of the cutters is placed at the top of the first cutting unit 100 (shown in FIG. 3), attached to a metal/polycarbonate frame 101 (shown in FIG. 3), driven by a motor 104, and controlled by a belt pully mechanism 103 (shown by dashed lines). Over the first-level 101*a* of roller cutters, to the top of the cutting unit frame 101 (shown in FIG. 3) is attached a hood, which may be any one of hoods 412, 514, or 615 shown in FIGS. 4-6, respectively.

Figure 1B:
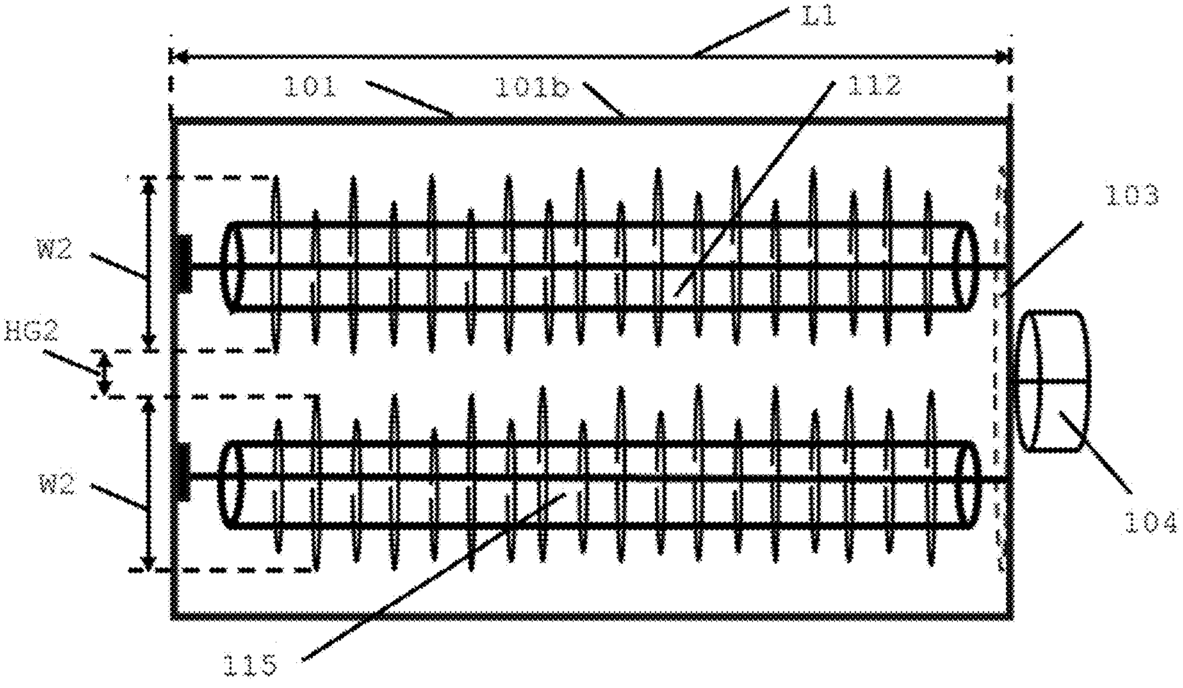
FIG. 1B shows a simplified top cross-sectional sketch of a second level of the first cutting unit, with the first motor, wherein the second level of the first cutting unit has two circular-straight roller cutters/shredders, in accordance with an embodiment of the present invention.
Figure 1C:
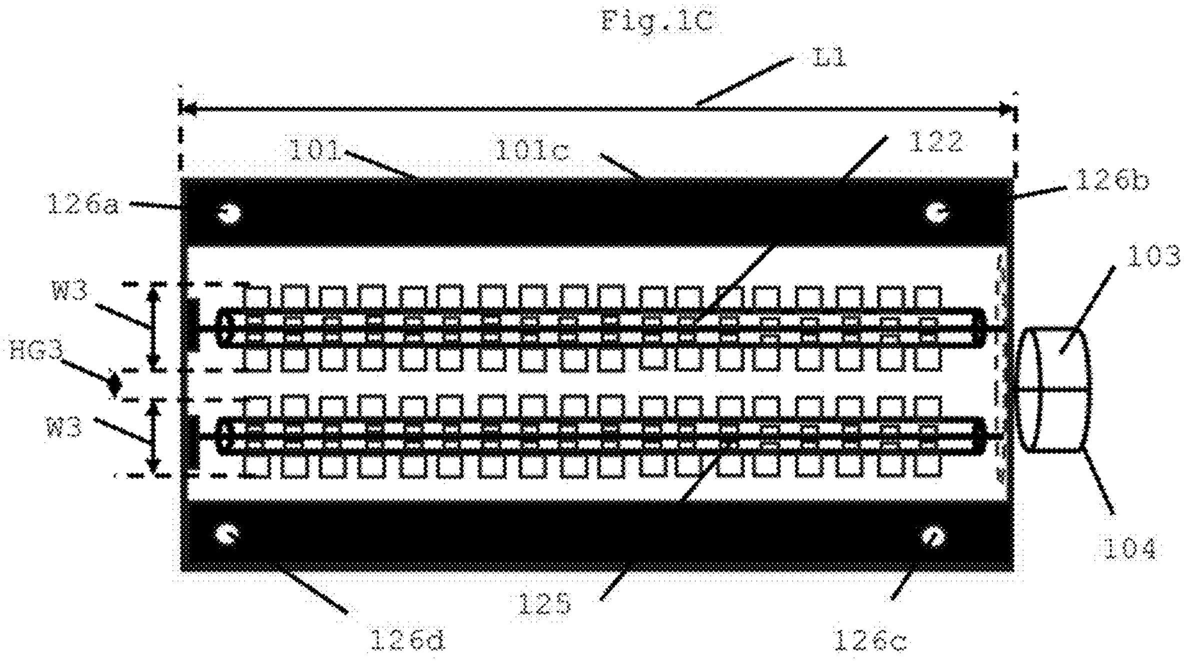
FIG. 1C shows a simplified top cross-sectional view sketch of a third level of the first cutting unit, with the first motor, wherein the third level of the first cutting unit has two saw tooth roller cutters/shredders, in accordance with an embodiment of the present invention.

In at least one embodiment, each of the cutting rollers or roller cutters/shredders 102, and 105, has a width or the maximum roller diameter of W1 (shown in FIG. 1A); each of the cutting rollers or roller cutters 112 and 115 have a width or the maximum roller diameter of W2 (shown in FIG. 1B), and each of the cutting rollers 122 and 125 have a width or the maximum roller diameter of W3 (shown in FIG. 1C). The width of W1 may be, for example, six inches. The width W2, may be, for example, five inches. The width of W3, may be, for example, four inches. The horizontal gap between the edges of the rollers 102 & 105 shown in FIG. 1A as HG1, may be three to four inches. Similarly, the horizontal gap between the rollers 112 & 115 which is the next lower level shown in FIG. 1B as HG2 is typically two to three inches and the horizontal gap between the rollers 122 and 125 at the lowest level shown in FIG. 1C as HG3 is typically one to two inches, It is preferred, in at least one embodiment, that the width W1 of the rollers of the top level 101*a* be greater than the next lower two levels 101*b* and 101*c*. It is preferred that the width W2 be greater than the width of the next lower level W3. Also, the horizontal gap between the top level to the lowest level will decrease incrementally. Thus, material is fragmented by level 101*a*, then next fragmented by level 101*b*, and next by level 101*c*, as the material falls through housing 101 due to gravity. The maximum gap, HG3, between rollers 122 and 125, (shown in FIG. 1C) is approximately between one to two inches, which is less than the gap between rollers 112 and 115, HG2 in FIG. 1B which is two to three inches. The gap HG1 between the rollers 102 and 105 at the top level shown in FIG. 1A is between three to four inches.

In at least one embodiment, the main purpose of the decreasing widths W1, W2, and W3 and the gaps HG1, HG2, HG3 between the appropriate rollers as material descends the levels is to achieve effective breakdown and to get under two square inches. For example, rollers 102 and 105 of first level 101*a*, break down input, garbage, or refuse material into more manageable pieces for second level 101*b*, which breaks down material further for level 101*c*. The materials are discarded directly below through the opening 704 in the metal or polycarbonate frame 101 into the recycle bin 705 shown in FIG. 7, or FIG. 8.

Figure 3:
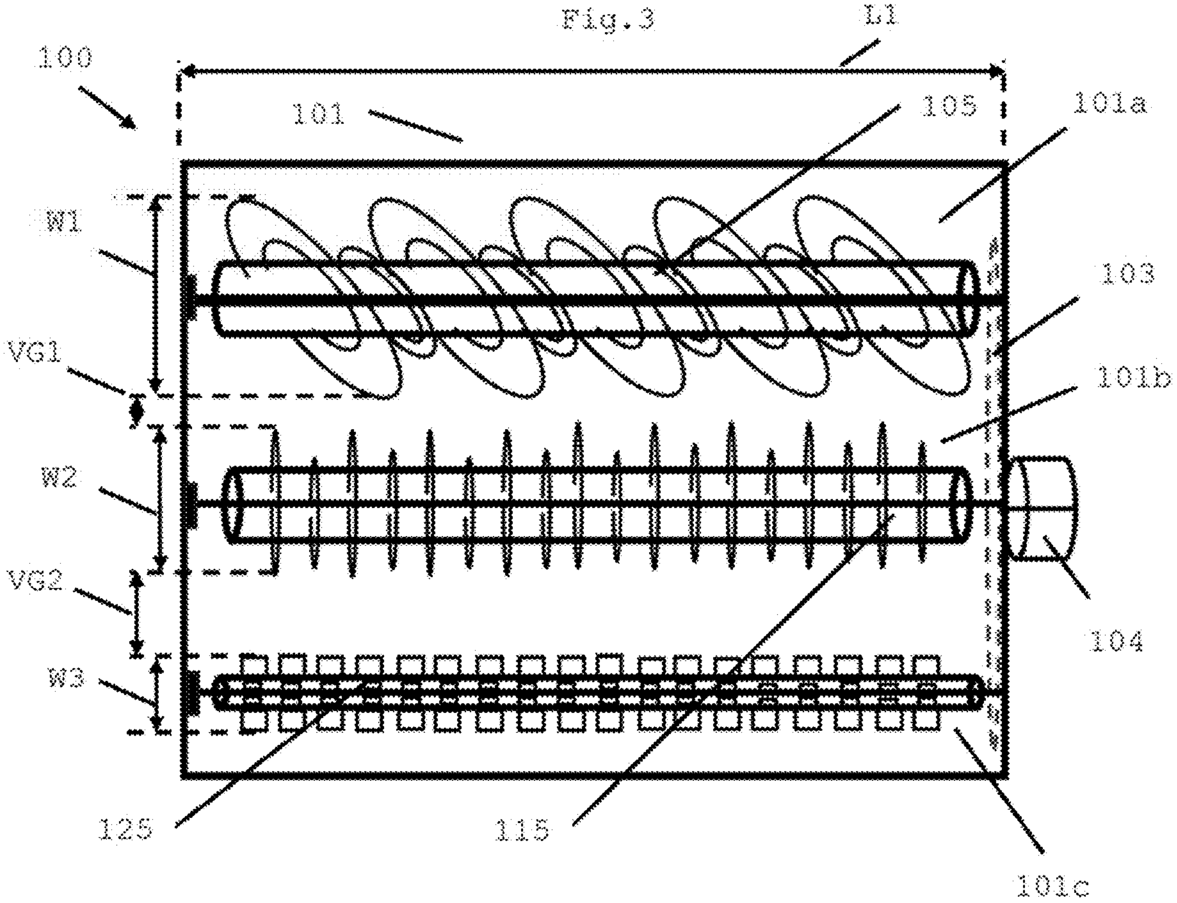
FIG. 3 shows a simplified front view sketch of the first cutting unit with stacked three-level roller cutters/shredders layout, in accordance with an embodiment of the present invention.

FIG. 1B shows a simplified top cross-sectional sketch of the second level 101*b* of the first cutting unit 100 (shown in FIG. 3), with two circular-straight roller cutters/shredders 112 and 115. For a three-level cutting unit 100 configuration as shown in FIG. 3, the second level 101*b* of the cutters is placed in the middle between the first level 101*a* of FIG. 1A and the third level 101*c* of FIG. 1C.

Figure 2:
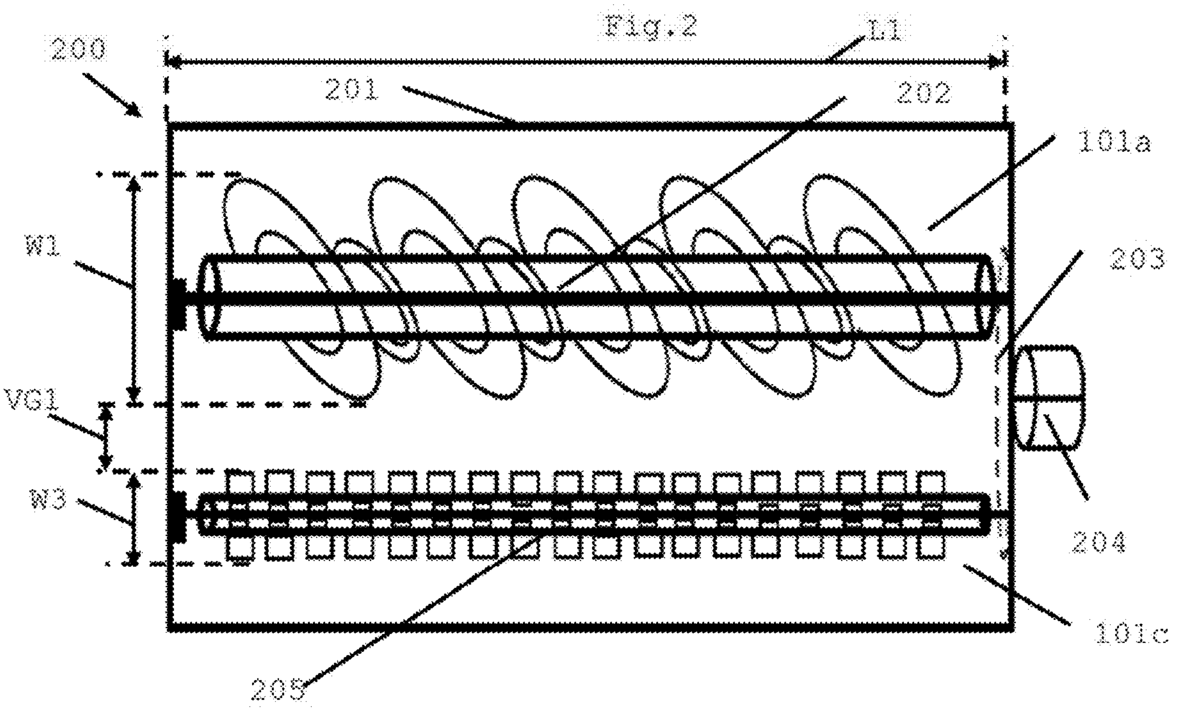
FIG. 2 shows a simplified front view sketch of a second cutting unit with stacked two-level roller cutters/shredders layout, in accordance with an embodiment of the present invention.

For a two-level cutting unit configuration or cutting unit 200 shown FIG. 2 there are no rollers analogous to roller 115 shown in FIG. 1B. The cutting unit 200 includes a metal or a polycarbonate frame 201 (which may be similar or identical to the frame 101 of FIG. 3, except typically smaller in size), driven by the motor shown in 204 (similar or identical to the motor 104 of FIG. 3, except only controlling two levels of cutters), and controlled by a belt pully mechanism 203, similar or identical to belt pully mechanism 103, except controlling only two levels of cutters not three.

FIG. 1C shows a simplified top cross-sectional sketch of a third level 101*c* of the first cutting unit 100, with two saw tooth roller cutters/shredders 122 and 125. The third level 101*c* is part of the same metal or polycarbonate frame 101 shown in FIG. 3. The metal or polycarbonate frame 101 is extended here with tapped screw holes 126*a*, 126*b*, 126*c*, 126*d* to screw the metal or a polycarbonate frame 101 to a base plate 703 in FIG. 7 or in FIG. 8. The rollers 122 and 125 of the third level 101*c* are driven by motor 104 and controlled by the belt pully mechanism 103. The cutting rollers or roller cutters 122 and 125 of the third level 101*c* have a width W3 shown in FIG. 1C and are smaller in width than the width W2 (shown in FIG. 1B) for rollers 112 and 115.

FIG. 2 shows a simplified front view sketch of a second cutting unit 200 in a stacked two-level roller cutters/shredders layout. FIG. 2 shows metal or polycarbonate frame or encasement 201, first level circular-angular cutting roller 202, second level saw tooth roller cutter 205, motor 204, and belt pully mechanics 203 (shown by dashed lines). There is a gap VG1 between rollers 202 and 205 which typically relates to the levels 101*a* and 101*c*. This vertical gap VG1 is measured from the edge of an outermost blade of the roller 202 to the edge of the outermost blade of the roller blade 205.

FIG. 3 shows a simplified front view sketch of first cutting unit 100 in a stacked three-level roller cutters/shredders layout. FIG. 3 shows 101, first level circular-angular cutting roller, 102, second level circular-straight roller 115 third level saw tooth roller cutter 125, motor 104 and belt pully mechanics 103 (shown by dashed lines).

A major purpose of the difference in widths W1, W2, and W3 is to break down an input material into manageable pieces for further processing at the lower levels. For example, rollers 102 and 105 of first level 101*a*, break down input, garbage, or refuse material into more manageable pieces for second level 101*b*, which breaks down material further for level 101*c*.

Figure 4:
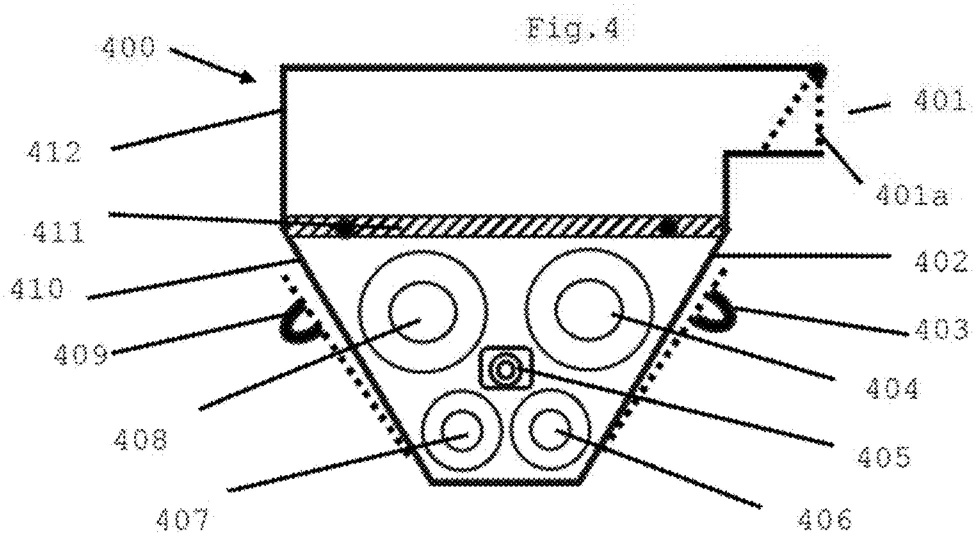
FIG. 4 shows a simplified side view of a third cutting unit with two roller cutters on a first level and two roller cutters on a second level, and wherein each level of the third cutting unit, may have one pair of the two roller cutters of FIG. 1A, the two roller cutters of FIG. 1B, or the two roller cutters of FIG. 1C, in accordance with an embodiment of the present invention.
Figure 5:
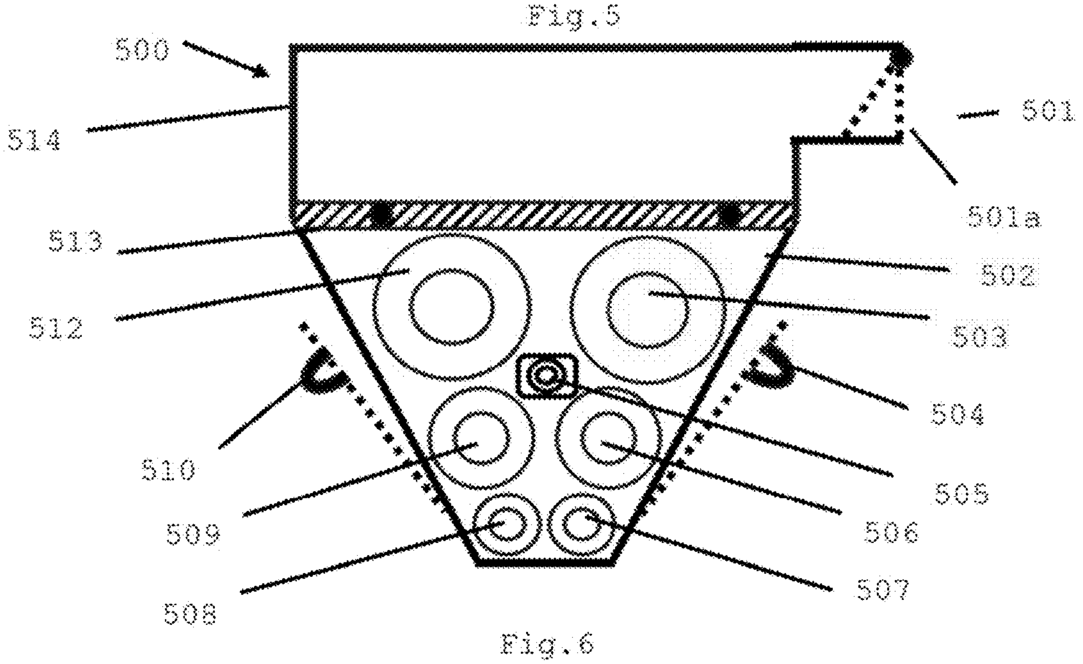
FIG. 5 shows a simplified side view of a fourth cutting unit with two roller cutters on each of first, second, and third levels, and wherein each level of the fourth cutting unit, may have one pair of the two roller cutters of FIG. 1A, the two roller cutters of FIG. 1B, or the two roller cutters of FIG. 1C, in accordance with an embodiment of the present invention.
Figure 6:
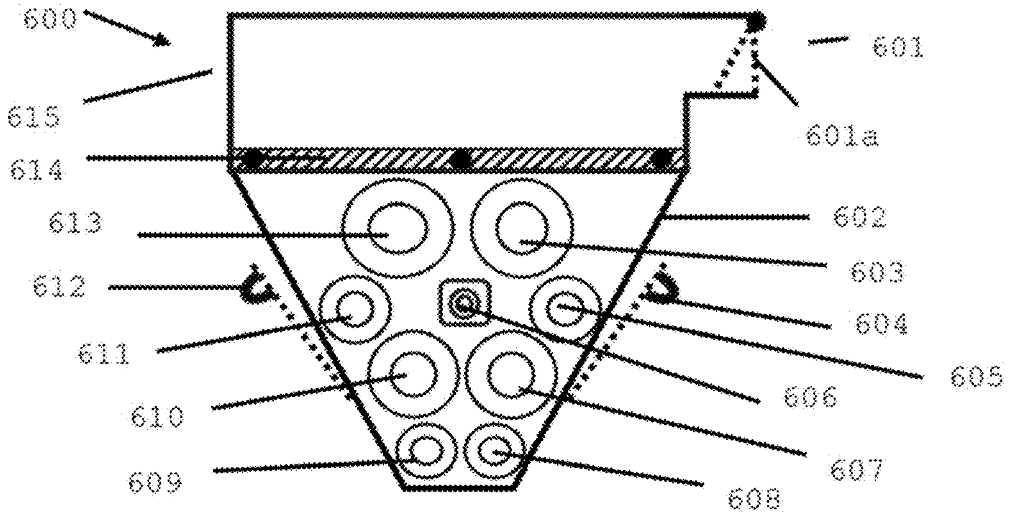
FIG. 6 shows a simplified side view of a fifth cutting unit with two roller cutters on each of first, second, third, and fourth levels, and wherein each level of the fifth cutting unit, may have one pair of the two roller cutters of FIG. 1A, the two roller cutters of FIG. 1B, or the two roller cutters of FIG. 1C, in accordance with an embodiment of the present invention.

As shown in FIGS. 4-6, hoods 412, 514, and 615 have inlets 401, 501, and 601, respectively. The hoods 412, 514, and 615 also have swing doors 401*a*, 501*a*, and 601*a*, respectively, which are shown by dashed lines. Each of the inlets 401, 501, and 601, and corresponding swings doors 401*a*, 501*a*, and 601*a*, is configured for feeding in recyclable materials.

FIG. 4 shows a simplified side view of a third cutting unit 400 in stacked two-level layout with two roller cutters 404 and 408 on the first level and two roller cutters 406 and 407 on a second level. The first level of the third cutting unit 400 will have one pair of roller cutters either from FIG. 1A or FIG. 1B, and the second as in FIG. 1C. FIG. 4 also shows the hood 412 or the protective cover with inlet 401 depicting the feeding inlet with a swing door 401*a* for material intake. FIG. 4 also shows a metal or polycarbonate frame or encasement 402 which may be identical or similar to frame 101 shown in FIG. 3.

In at least one embodiment, the hood 412 is connected to the metal or polycarbonate frame 402 through snap in joint 410 with nut bolt fastening. FIG. 4 also shows a motor 405, and metal swing door openings 403 and 409 on the sides of the frame 402 for cleaning out of stuck roller debris.

FIG. 5 shows a simplified side view of a fourth cutting unit 500 in stacked three-level layout with two roller cutters 503 and 512 on a first level, two roller cutters 506 and 509 on second level 506 & 509 and two roller cutters 507 and 508 on third level. Each of the levels of the fourth cutting unit 500 will have one pair of roller cutters from FIG. 1A, FIG. 1B, and FIG. 1C, at the first, second and third level respectively. FIG. 5 shows the hood or protective cover 514 with feeding inlet 501 and swing door 501*a* material intake.

FIG. 5 also shows a metal or polycarbonate frame or encasement 502. FIG. 5 also includes a snap in joint with nut and bolt fastening 513 which connects the hood 514 to metal or polycarbonate frame 502. FIG. 5 further shows a motor 505 and metal swing door openings 504 and 510 on the sides of the cutting unit frame 502 for cleaning out of stuck roller debris.

FIG. 6 shows a simplified side view of a fifth cutting unit 600 in a zagged four-level layout with two roller cutters 603, and 613 on a first level, roller cutters 605 and 611 on a second level, roller cutters 607, and 610 on a third level, and roller cutters 608 and 609 on a fourth level. Each level of the fifth cutting unit 600 can have one pair of roller cutters from either FIG. 1A, FIG. 1B, or FIG. 1C. FIG. 6 shows a hood or protective cover 615. FIG. 6 shows a feeding inlet 601 with a swinging door 601*a* (shown in dashed lines) for material intake.

FIG. 6 shows a metal or polycarbonate frame or encasement 602, and the hood 615 may be connected by snap in joint with nut bolt fastening 614, to the metal or a polycarbonate frame 602. FIG. 6 further includes a motor 606 and metal swing door openings 604 and 612 on the sides of the cutting unit frame 602 for cleaning out of stuck roller debris.

Figure 7:
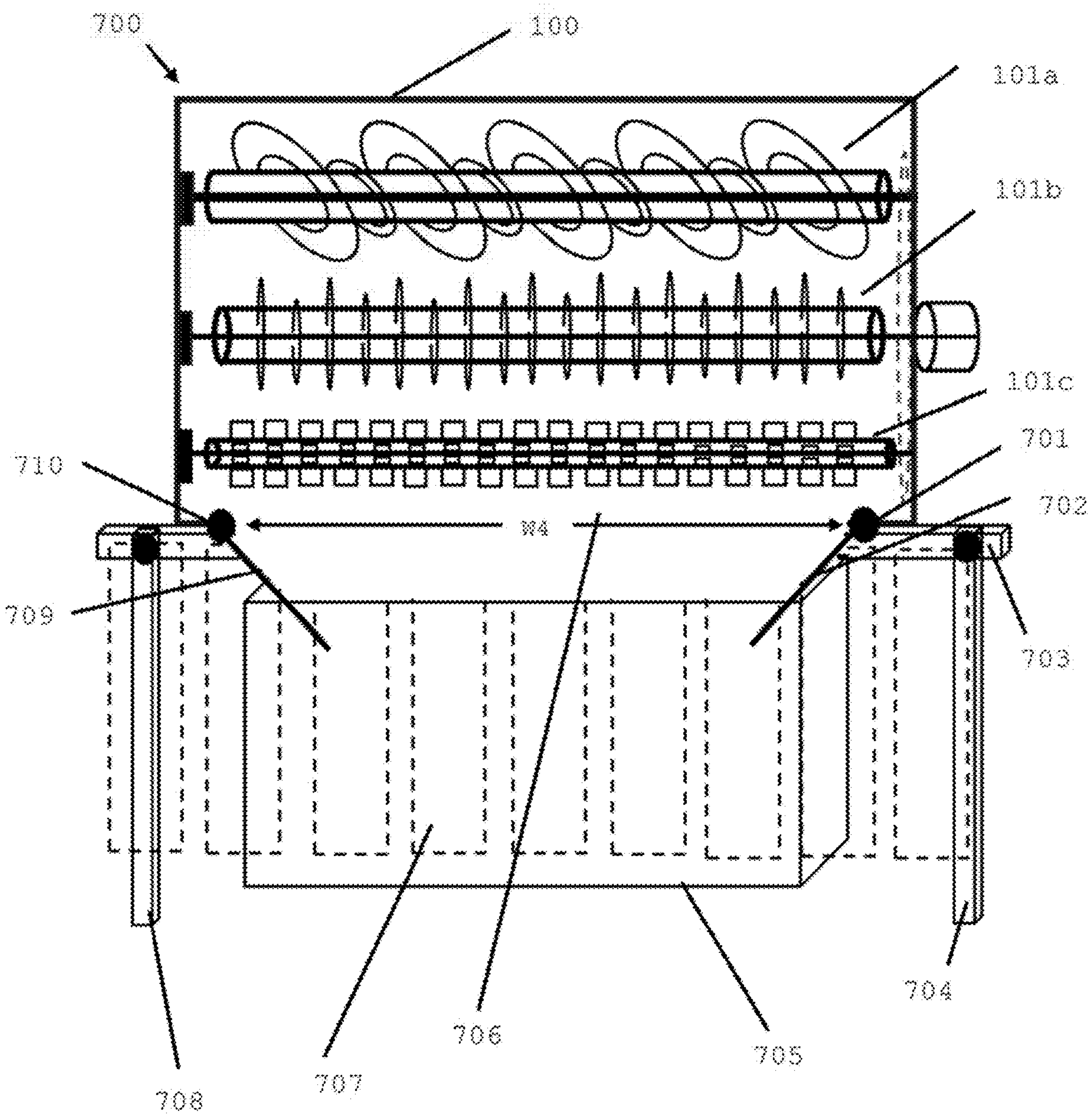
FIG. 7 shows a simplified front view of a first apparatus, a small configuration, which includes the second cutting unit of FIG. 2, mounted on to a base plate with extensible legs and protective vinyl/rubber strips around the base.

FIG. 7 shows a simplified view of a first fragmentation apparatus 700 in a small configuration, a small in-home unit for breakdown of all the household consumable recyclable discarded materials, with three-level cutting unit 100. In at least one embodiment, the cutting unit frame bottom 706 shown in FIG. 7, will have an opening slot or central opening of fifteen square inches, and a width of W4, shown in FIG. 7, which may be approximately fifteen inches, under the lowest level 101*c* for discarding of the broken-down materials. The entire cutting unit frame 101 is attached to a base plate 703, secured with series of nuts and bolts of which the front two are shown as nuts and bolts 701 and 710. The base plate 703, in at least one embodiment, will be two square feet in area The base plate 703 has an opening which will be similar to opening 706 of the cutting unit 100. The base plate 703 will also have funnel attachment 702 and 709 around central opening 706 on the inner side to channel the discarded materials into the recycling bin 705 below. The base plate 703 is attached to four legs including 704, 708, and two other legs not shown, extendable up to thirty-six inches to fit a medium recycle bin 705, which may be up to fifteen gallons. The entire base plate 703 will also have provision to attach hard protective vinyl/rubber strips 707 around the perimeter to prevent any accidents.

The entire fragmentation unit or apparatus 700 is also configurable with the cutting unit 200, i.e. the cutting unit 100 may be replaced with the cutting unit 200 in the FIG. 7 embodiment. The preferred length, L1, shown in FIG. 3 for the configuration of apparatus 700 and cutting units 100 or 200 typically will not exceed fifteen inches for safety, effective discharge of recycled materials from the slot 706 and to fit within the area (approximately fifteen square inches) of opening 706 Shown in 700 of FIG. 1C on the base plate 703.

Figure 8:
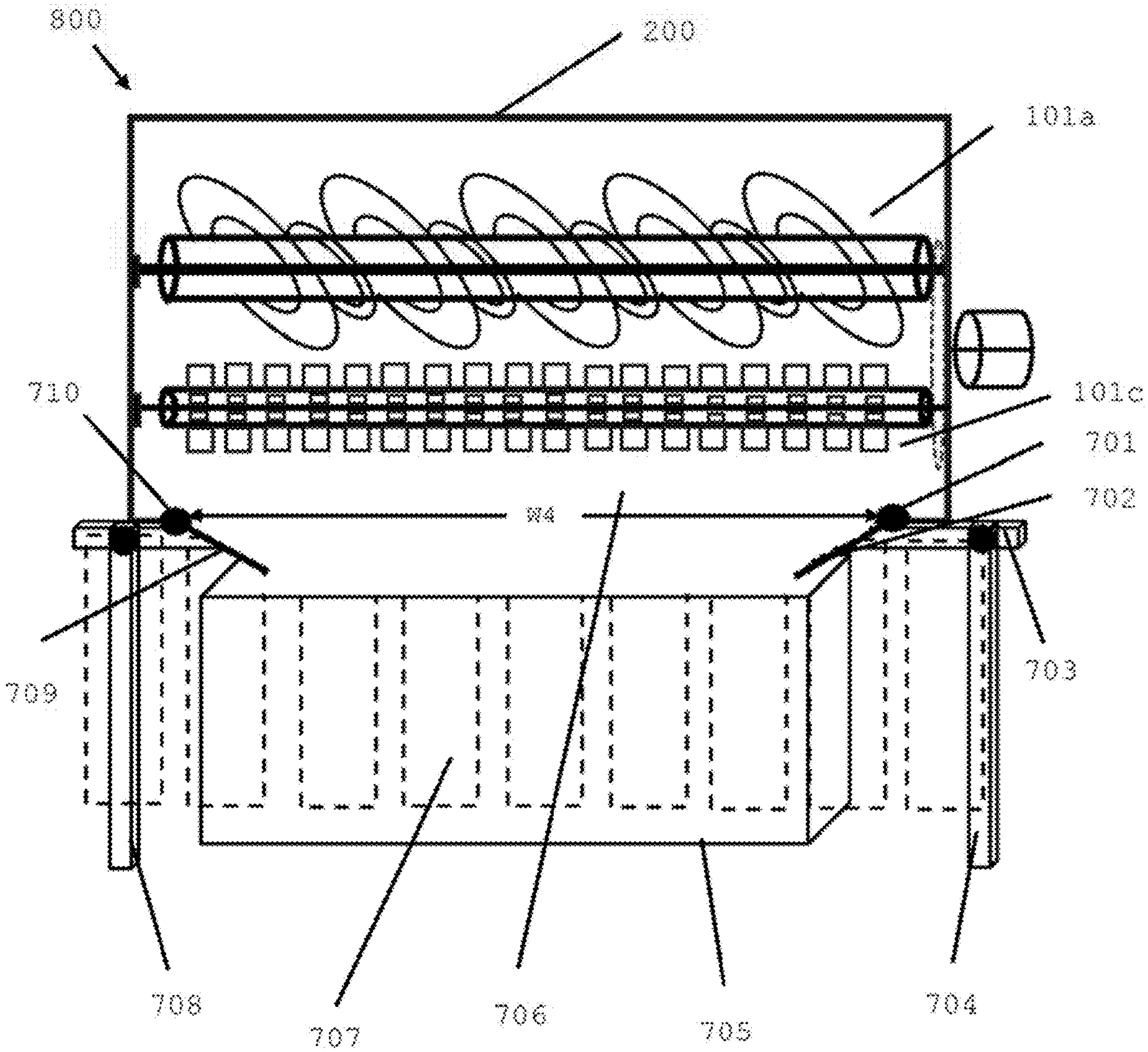
FIG. 8 shows a simplified front view of a second apparatus, also in a small configuration, which includes the second cutting unit of FIG. 2, attached to a base plate with extendable legs and protective vinyl/rubber strips around the base.

FIG. 8 shows apparatus 800 which is a small configuration of a fragmentation unit, like apparatus 700 except for having a two-level cutting unit 200 instead of a three-level cutting unit 100.

Figure 9A:
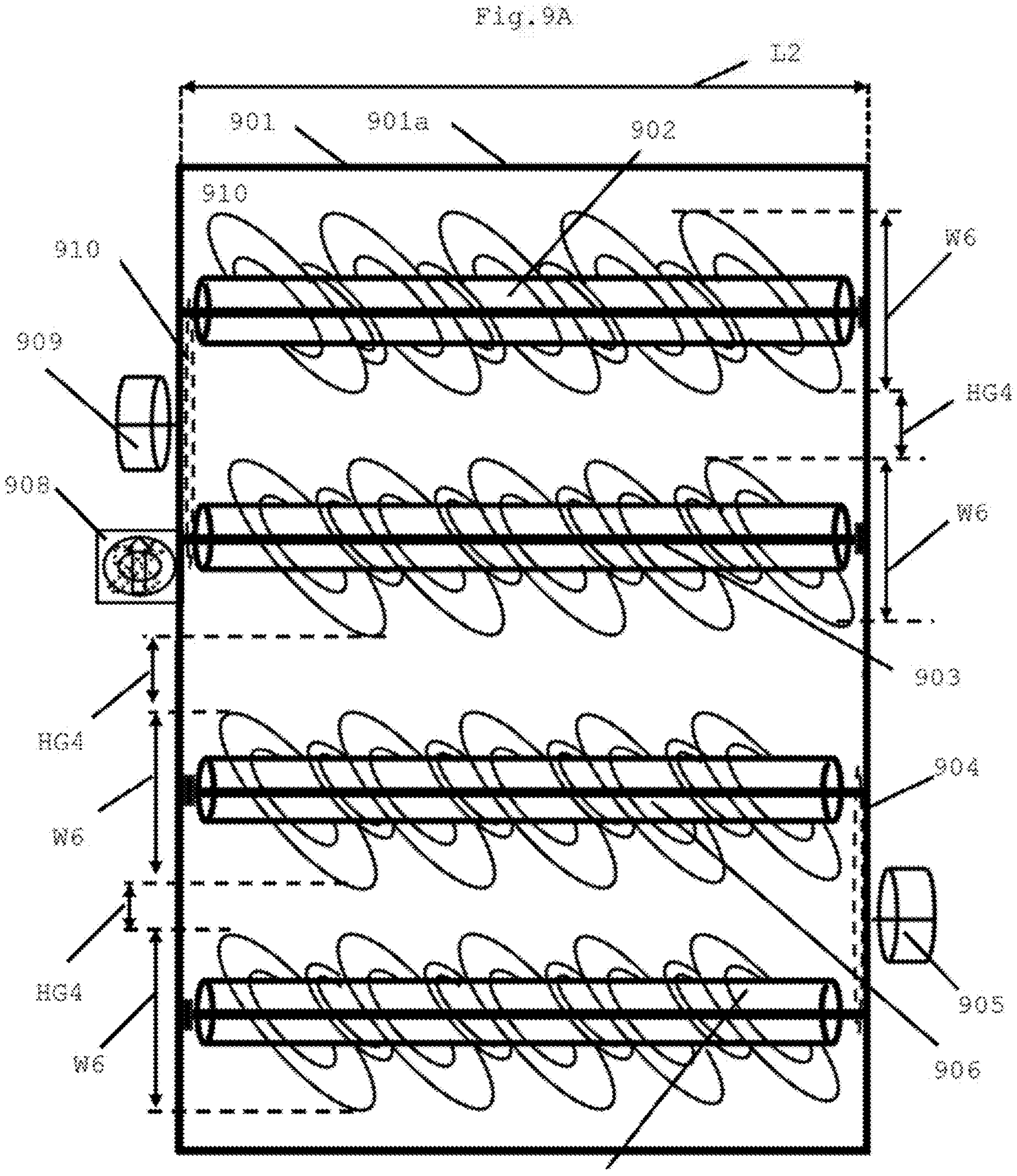
FIG. 9A shows a simplified top view sketch of a first level of a sixth cutting unit, shown with dual motors and four angular roller cutters/shredders, in accordance with an embodiment of the present invention.
Figure 12:
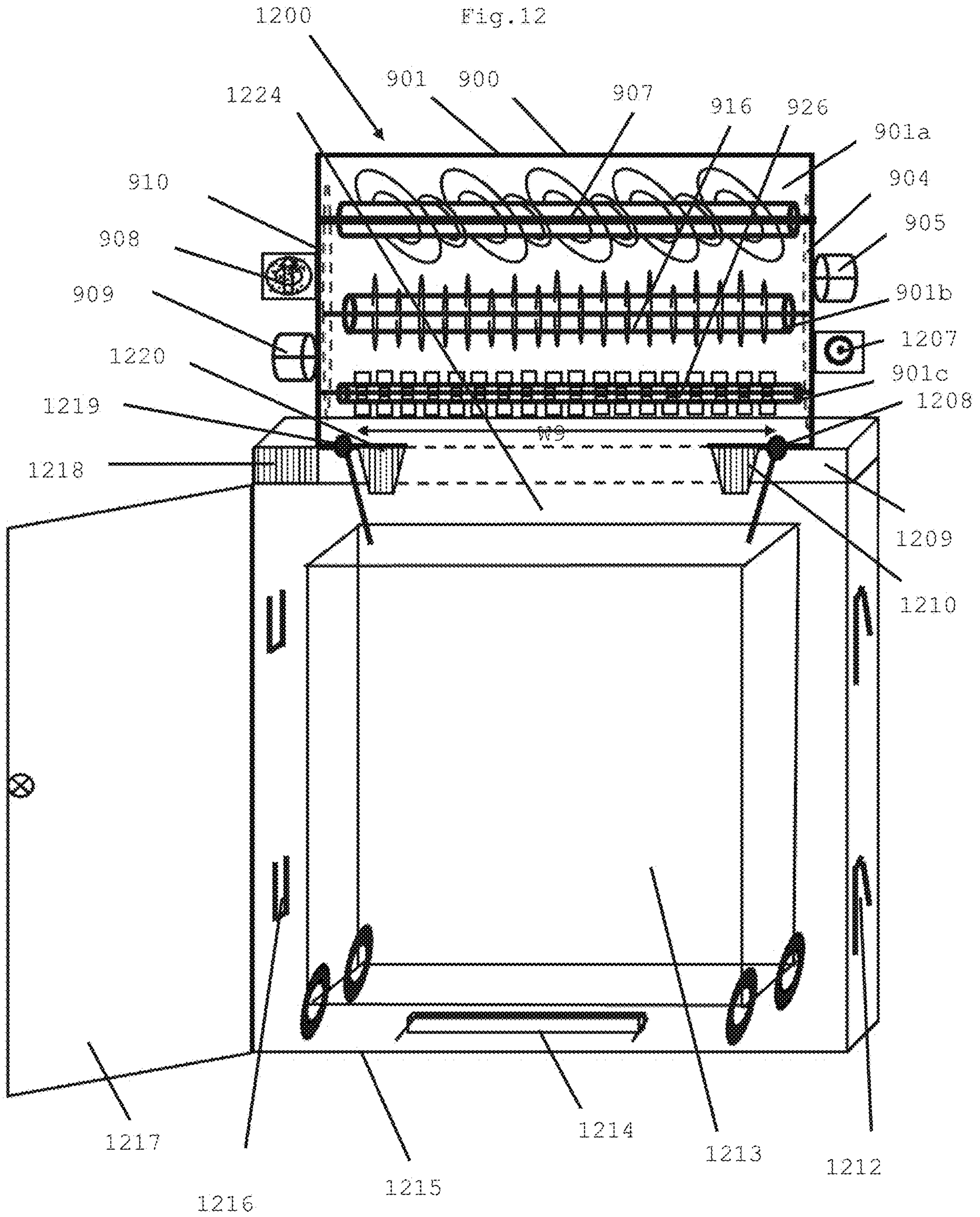
FIG. 12 shows a simplified front view of a third apparatus, which includes the eighth cutting unit a front view of which is shown, attached to a base unit with a door, on board sensors/electronics, and latches for extension, in accordance with an embodiment of the present invention.

FIG. 9A shows a simplified top view sketch of a first level 901*a* of a cutting unit, within a frame 901 shown with dual motors 905 and 909 and four circular-angular roller cutters/shredders 902, 903, 906 and, 907 driven by belt pulley mechanism 904 and 910 and will fit a medium configuration fragmentation unit as shown in FIG. 12. The width of the rollers is W6 and the horizontal gap between the roller edges is HG4. The length of the rollers, L2, will be approximately eighteen to twenty-one inches. The two motors 905 and 909 are configured to be synchronized and controlled with a three-speed motor-controlled switch 908 or controlled programmatically.

In at least one embodiment, the rollers 902, 903, 906, 907 are of similar width or diameter to W1 and similar horizontal gap HG1 to that between rollers as shown in FIG. 1A, however, the number of rollers in this layout is double that shown in FIG. 1A.

Figure 9B:
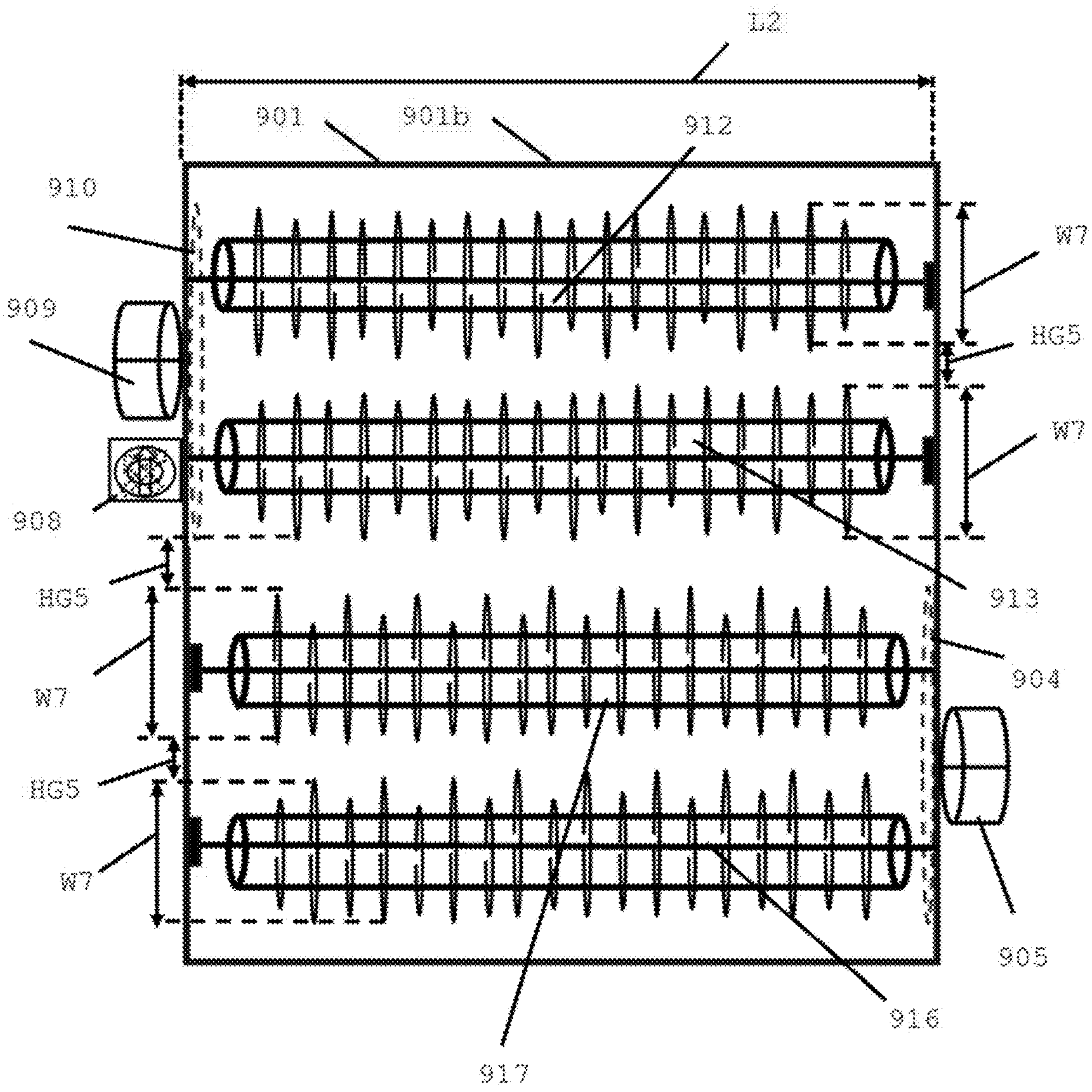
FIG. 9B shows a simplified top cross-sectional sketch of a second level of the sixth cutting unit, shown with the dual motors and with four circular roller cutters/shredders, in accordance with an embodiment of the present invention.

FIG. 9B shows a simplified top cross-sectional view of the second level 901*b* of a cutting unit, of within frame 901 shown with dual motors 905 and 909, speed controlled with a three-speed control switch 908 as in FIG. 9A and four circular-straight roller cutters/shredders 912, 913, 916 and 917 driven by belt pulley mechanics 904 and 910, and will fit a medium configuration fragmentation unit as shown in FIG. 12. The width of the rollers is W7 and the horizontal gap between the roller edges is HG5. The length of the rollers L2 will be approximately eighteen to twenty-one inches. In at least one embodiment, the rollers 912, 913, 916, and 917 are of similar width or diameter W2 and with similar horizontal gap HG2 to that between rollers as shown in FIG. 1B, however, the number of rollers in this layout is double than that showed in FIG. 1B.

Figure 9C:
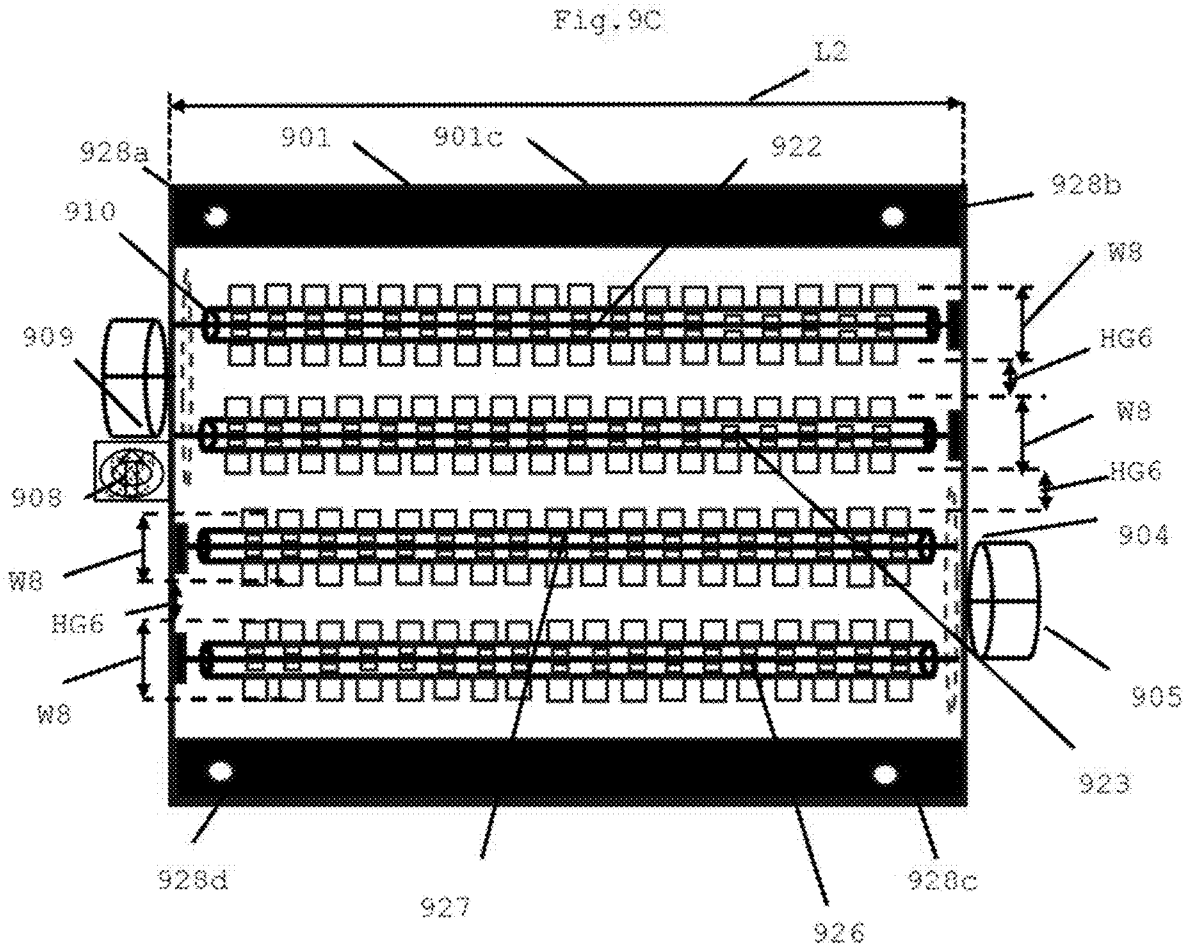
FIG. 9C shows a simplified top cross-sectional sketch of a third level of the sixth cutting unit, shown with the dual motors and four saw tooth roller cutters/shredders: in accordance with an embodiment of the present invention.

FIG. 9C shows a simplified top cross-sectional view of a third level 901*c* of a cutting unit 901*c*, of the frame 901 shown with dual motors 905 and 909, speed controlled with a three-speed control switch 908 as in FIG. 9A and four circular-straight roller cutters/shredders 922, 923, 926 and 927, driven by belt pulley mechanics, mechanisms, or a devices 904 and 910, and will fit a medium configuration fragmentation unit as shown in FIG. 12. The width of the rollers is W8 and the horizontal gap between the roller edges is HG6. The length of the rollers L2 will be approximately eighteen to twenty-one inches. In at least one embodiment, the rollers 922, 923, 926, and 927 are of similar width or diameter W3 and with similar horizontal gap HG3 to that of rollers as shown in FIG. 1C, however, the number of rollers in this layout is double than in FIG. 1C. The third level 901*c* is part of the same metal or polycarbonate frame 901 which is extendable here with tapped screw holes 928*a*, 928*b*, 928*c*, and 928*d* to screw the metal or polycarbonate frame 901 to the header of the base unit 1208 as shown in FIG. 12.

Figure 10:
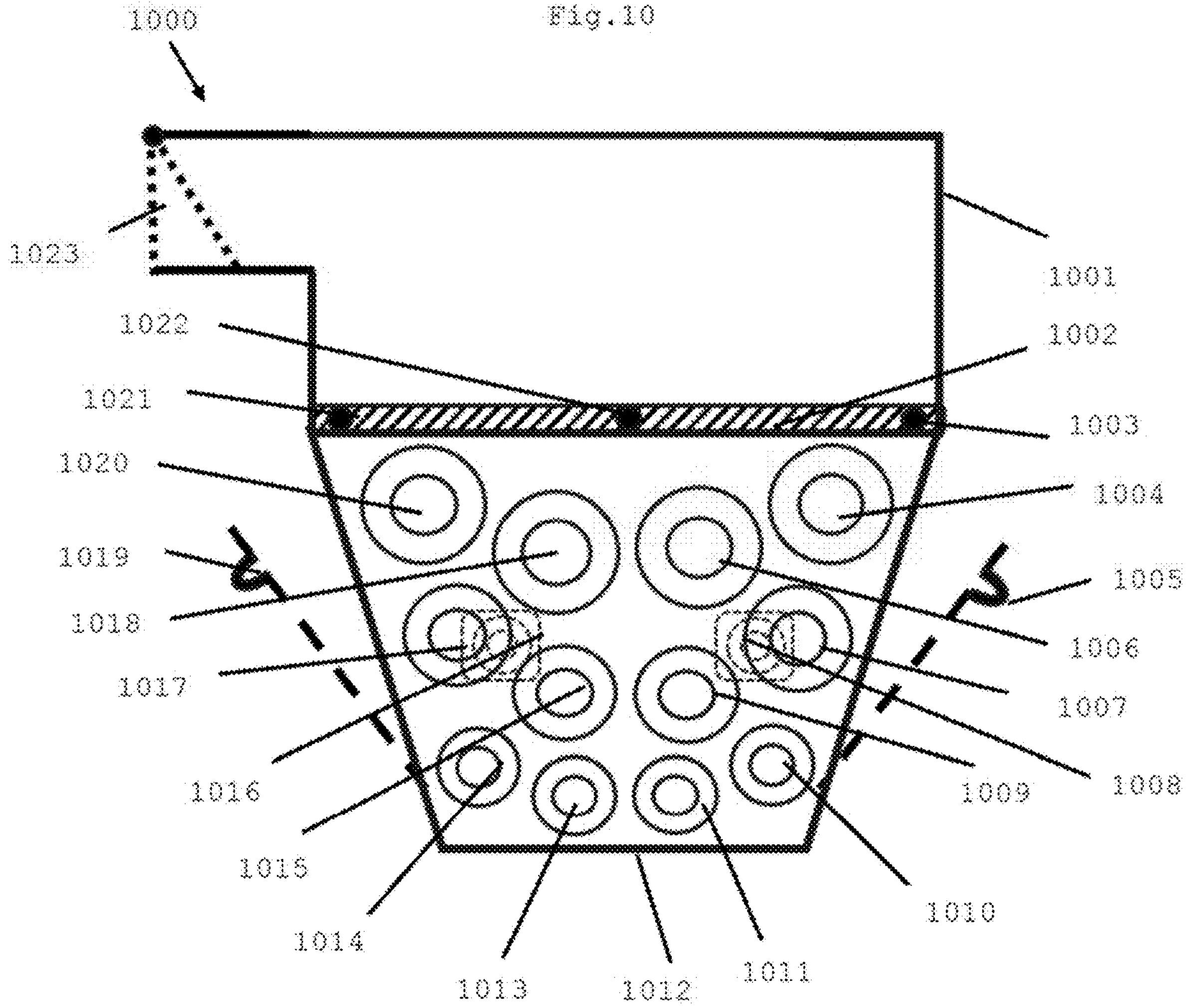
FIG. 10 shows a simplified side view of a seventh cutting unit with four roller cutters, on each of three levels, wherein each level, can be any set of four from either FIG. 9A, FIG. 9B or FIG. 9C stacked in a layout, in accordance with an embodiment of the present invention.

The rollers in a cutting unit using levels 901*a*, 901*b*, and 901*c* will be double with a total of twelve rollers (902, 903, 906, 907, 912, 913, 916, 917, 922, 923, 925, and 926) compared to six for the cutting unit 100. Each of the roller lengths for the configuration of FIGS. 9A-C are also larger than lengths of the rollers for the cutting unit 100. Each of the roller lengths for each of rollers 902, 903, 906, 907, 912, 913, 914, 915, 922, 923, 925, and 926 may be approximately eighteen to twenty-one inches. There is one motor on each side, for a total of two motors 905 and 909 for a cutting unit including units 901*a*, 901*b*, and 901*c* for driving the rollers 902, 903, 912, 913, 922, 923 and 909 for driving rollers 906, 907, 914, 915, 925, and 926 respectively with belt pully drive mechanism 904 and 908 for each on either side FIG. 10 shows the side view of a cutting apparatus 1000 in medium configuration with twelve rollers 1004, 1006, 1007, 1009, 1010, 1011, 1013, 1014, 1015, 1017, 1018, and 1020 controlled by two motors 1008 and 1016. FIG. 10 shows metal or polycarbonate frame 1012 with two openings 1005 & 1019 with swing doors on the sides for cleaning out the stuck debris from the rollers and an opening at the bottom 1012 of the cutting apparatus 1000 for discarding materials into the recycle bin below. FIG. 10 also shows hood 1001 with an inlet with a swing door 1023. FIG. 10 also shows a snap in joint 1002 between the cutting unit frame 1012 and the hood 1001, with additional three nut bolt fasteners 1003, 1021, and 1022.

Figure 11A:
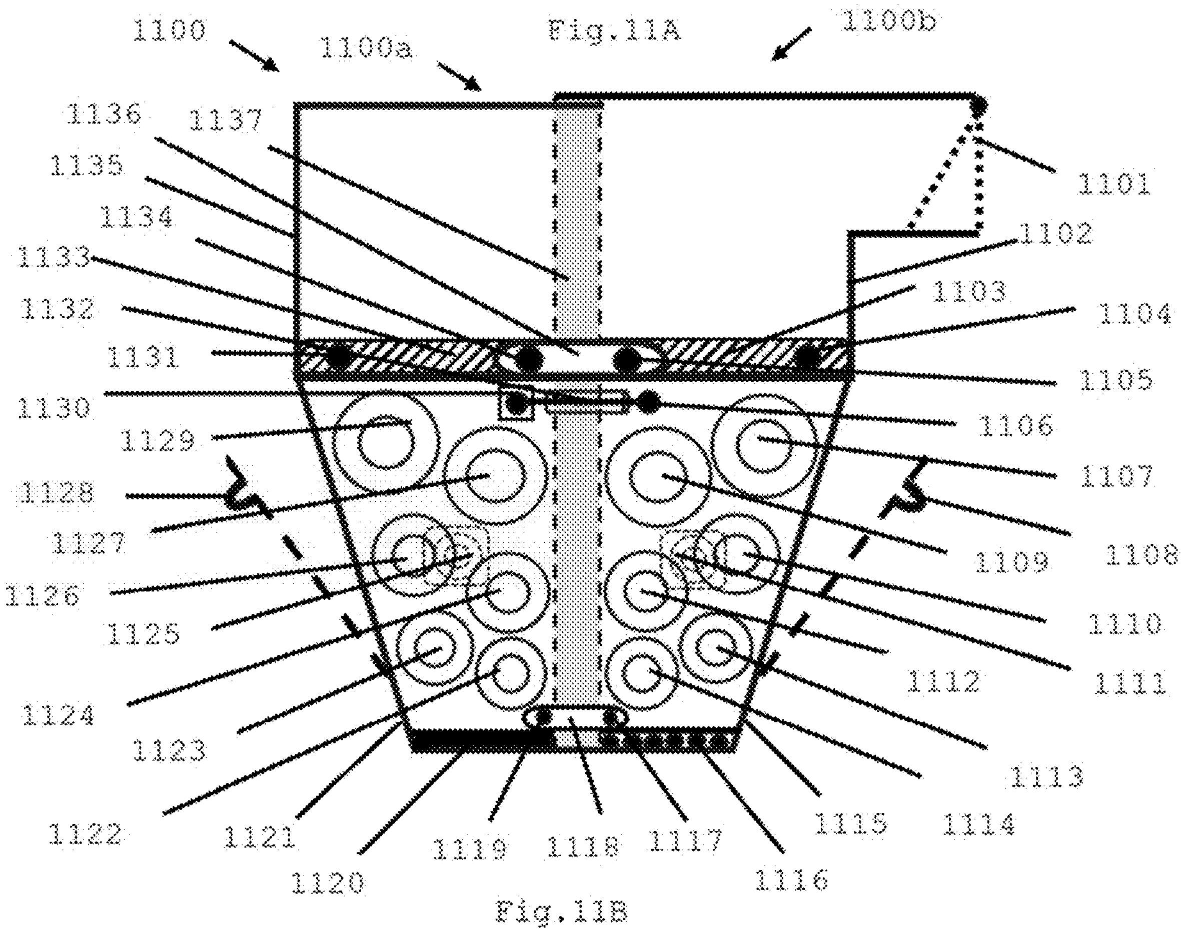
FIG. 11A shows a simplified side view of an eighth cutting unit on each of three levels, wherein each level can be any set of four from either FIG. 9A, FIG. 9B or FIG. 9C in stacked layout, wherein this view represents the eighth cutting unit in a split design variant that will allow for a feeder gap to be adjusted with the ability for a half section of the cutting unit to slide into the other, by a linear actuator, and sliding mechanism while the roller cutters/shredders of section being controlled by two different motors, in accordance with an embodiment of the present invention.
Figure 11B:
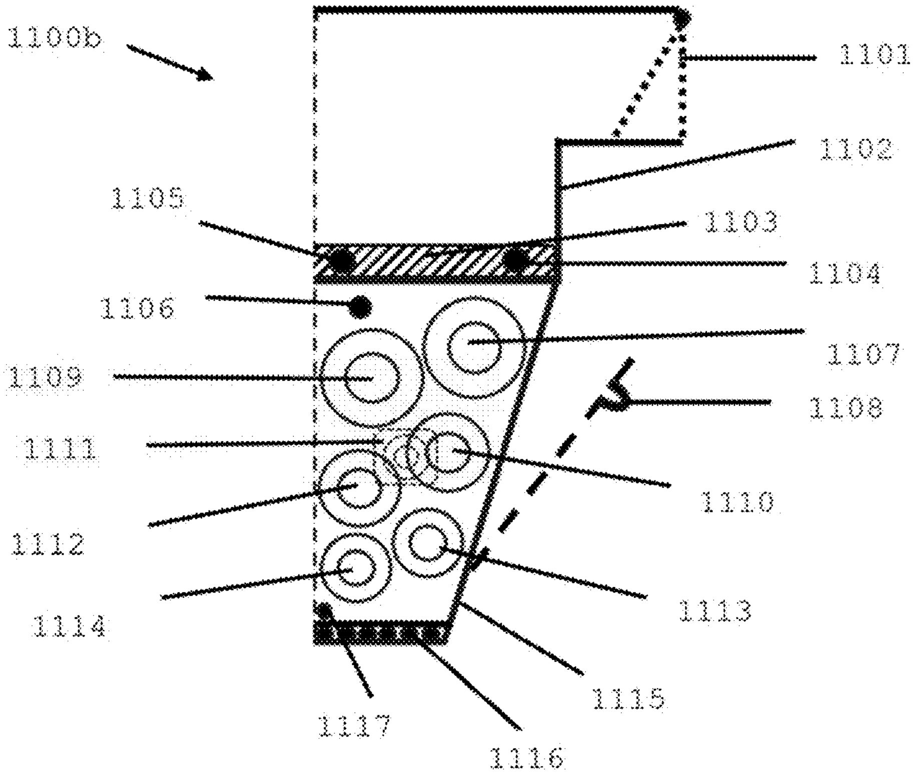
FIG. 11B shows a side view of a horizontal half section of the eighth cutting unit that has the ability slide to create a variable gap depending on the material sizes; in accordance with an embodiment of the present invention.

FIG. 11A shows a side view of a cutting unit or apparatus 1100 which is of medium configuration, The design is similar to the cutting unit or apparatus 1000 shown in FIG. 10 but the apparatus 1100 in FIG. 11A is in a split mode. The cutting unit or apparatus 1000 is divided into two vertical sections 1100*b* and 1100*a* shown separately in FIG. 11B and FIG. 11C, respectively, with each half having six rollers and controlled by separate motors 1111 and 1125, respectively. FIG. 11B includes rollers 1107, 1109, 1110, 1112, 1113, and 1114 and FIG. 11C includes rollers 1122, 1123, 1124, 1126, 1127, and 1129. A metal or polycarbonate frame 1121 of the left section FIG. 11C is attached to a base extension plate 1120 and fastened in place to a base plate 1208 as in FIG. 12, and the right section as shown in FIG. 11B has a frame 1115 connected to a base unit header 1209 of the of the base unit 1215 as shown in FIG. 12 with a draw/roller slide mechanism 1116 to facilitate movement.

The motion of the half section 1100*b* shown in FIG. 11B will be controlled by a linear actuator 1132. The linear actuator 1132 is bolted to the metal or polycarbonate frame 1115 shown in FIG. 11B at the screw hole location 1106 on one side and bolted to the metal or polycarbonate frame 1121 shown in FIG. 11C at the screw hole location 1130. FIG. 11B and FIG. 11C also show metal frames 1115 and 1121. The metal frames 1115 and 1121 also have additional metal plate roller fasteners 1118 and 1136 latched to bolts 1117, 1119 and 1105 and 1134 respectively that allow for the movement of the entire half section of the device 1100*b* as shown in FIG. 11B and securely fastened to the static half section of the cutting unit 1100*a* as shown in FIG. 11C. A hood 1102 shown in FIG. 11B with a unit inlet with a swing door 1101 is attached to frame 1115 by snap in joint at location 1103 and bolts 1104 and 1105.

Figure 11C:
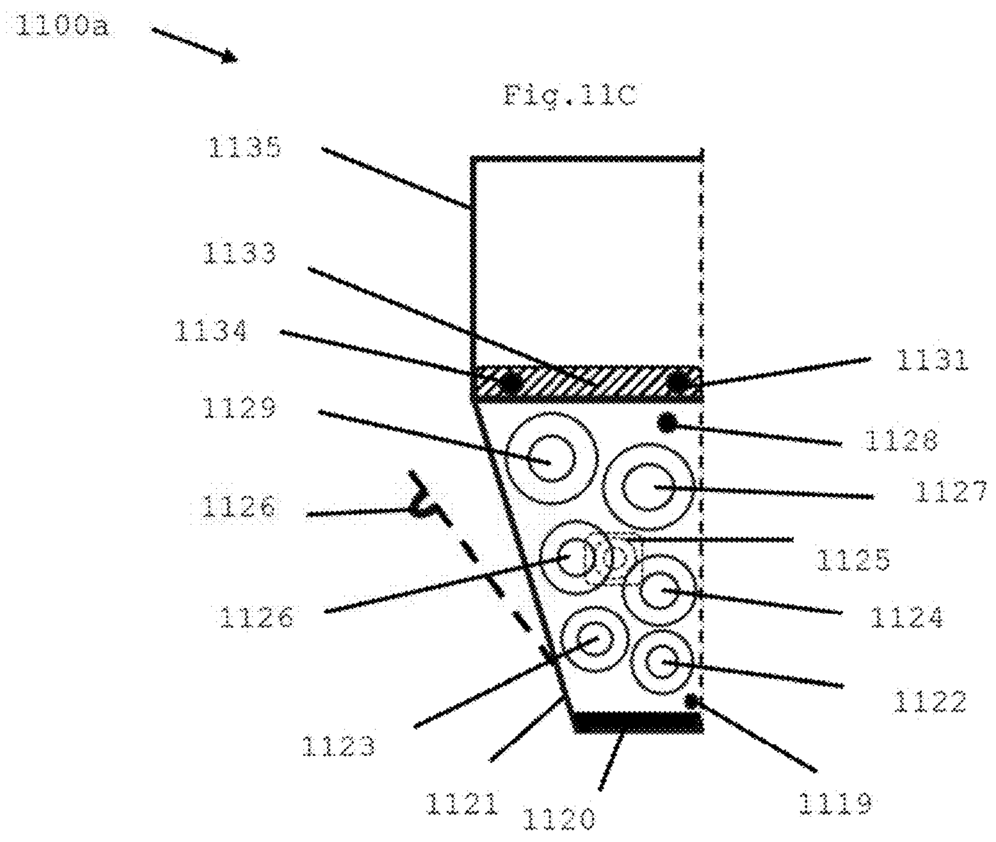
FIG. 11C shows a side view of a horizontal half section of the eighth cutting unit that will be static, in accordance with an embodiment of the present invention.

Similarly, the hood section 1135 shown in FIG. 11C is attached to frame 1121 with snap in joint at location 1133 and bolt joints 1131 and 1134. FIG. 11B also shows swing doors 1108 and 1128 for cleaning out. FIG. 11B also shows gap cover/sleeve 1137 between the two half cutting units shown by FIG. 11B and FIG. 11C.

FIG. 11B as described in the previous section shows a first half 1100*b* of a cutting unit and this first half of the cutting unit has the frame 1115 connected to the base header 1209 of the base unit 1215 with a draw/roller slide mechanism 1116 to facilitate movement, which will be fastened in place to the base plate 1208 as shown in FIG. 12.

FIG. 11C as described in the previous section shows a second half 1100*a* of the cutting unit 1100, wherein the second half 1100*a* is static and the half or portion 1100*a* has a frame 1121 attached to a base extension plate 1120 and fastened in place to the base plate 1208 as shown in FIG. 12.

FIG. 12 shows a simplified sketch of a fragmentation apparatus 1200 in a medium configuration, wherein cutting unit 900 (having levels 901*a-c*) is shown in its front view with three levels (901*a-c*) and first three rollers 907, 916, and 926 shown, similar or identical to as in FIG. 3 except that the total number of rollers shown in FIG. 12 is twelve and the length of the rollers is also larger than in FIG. 3. The length of the rollers for FIG. 12 may be between eighteen and twenty-one inches. The cutting unit rollers or roller cutters 907, 916, and 926 of the levels 901*a-c*, and the other rollers cutters of the levels 901*a-c*, are driven by dual motors 905 and 909, and belt pully mechanics, devices or mechanisms 904 and 910, a programmable motor speed controller 908 and a linear actuator 1207.

There are additional sensors attached to cutting unit or apparatus 900 shown in the configuration of FIG. 12. FIG. 12 shows a fill sensor 1210 that measures the fill level of the recycle bin 1213 and a wireless camera 1220 to check the quality of the discarded material in the recycle bin 1213. FIG. 12 also shows a motion controller or speed control switch 908 that in at least one embodiment may also be programmable. Similarly, FIG. 12, also shows a linear actuator 1207 that also may be programmable. FIG. 12 also shows an onboard Wi-Fi enabled multi-channel microcontroller 1216. The cutting unit frame 1201 is bolted to the base unit header 1209 with front two bolt joints 1208 and 1217. The base header opening slot 1224 for discarding of the processed materials will be between eighteen square Inches and twenty-one square Inches in area; the width of which is marked W9 and will be between eighteen and twenty-one inches. In at least one embodiment, the dimensions of the entire base unit 1215 with the door 1217 will be approximately 36.0×36.0×48.0 inches for a fifty gallon recycle bin to roll into the unit. FIG. 12 shows a simplified sketch of a recycle bin 1213 with four wheels. FIG. 12 shows weight sensor 1214, which is used to capture weight discarded materials and to provide a weight indication of the materials which also is connected to the programmable onboard micro controller 1218. Latches 1212 and 1216 are provided on the sides of the base unit 1215 of the apparatus 1200 as shown in FIG. 12 to enable and safely secure multiple units 1200 and 1200', which are shown latched together in FIG. 13.

Figure 13:
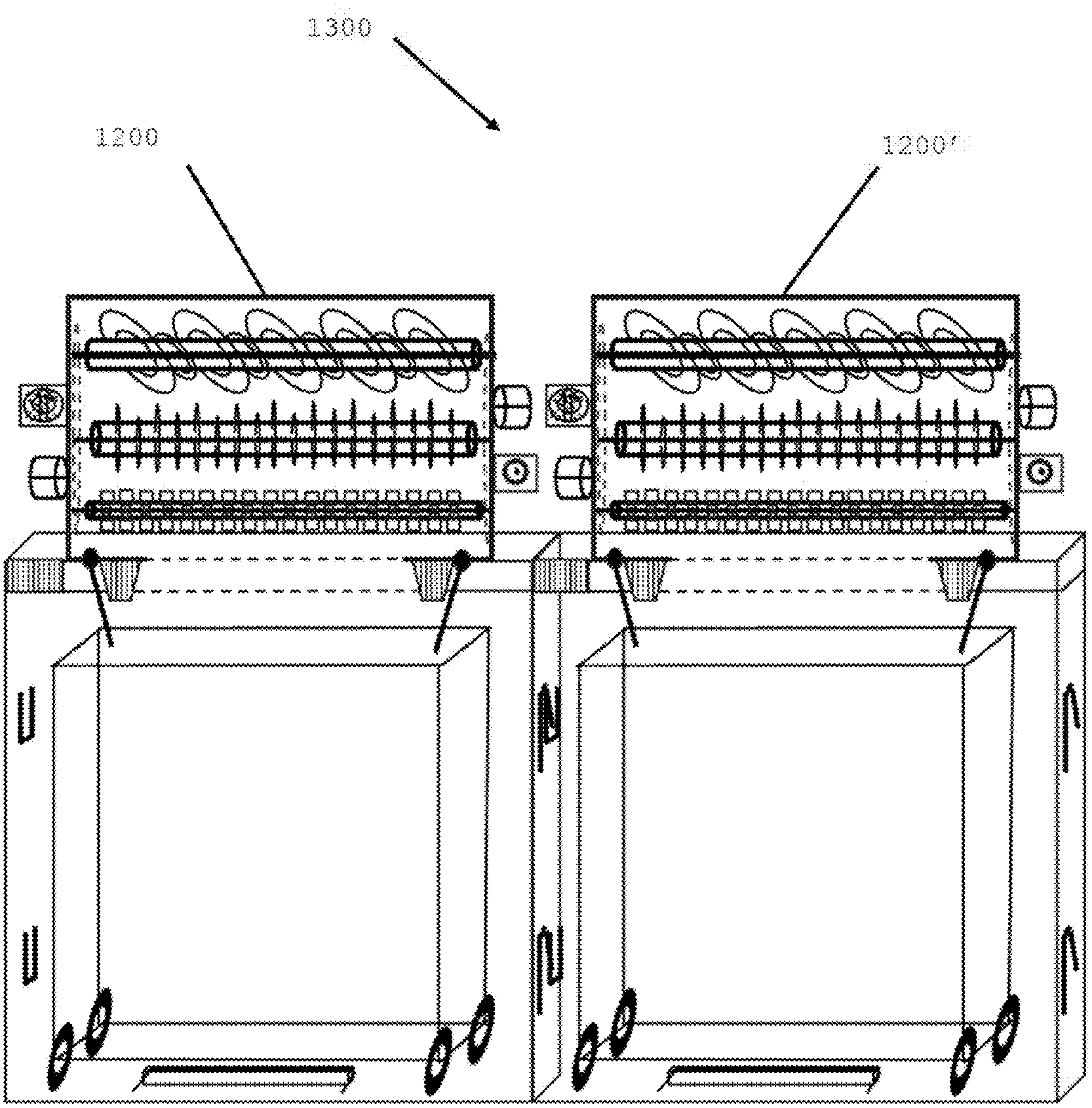
FIG. 13 shows a simplified front view of two of the third apparatus of FIG. 12 side by side, attached together for additional capacity where required, in accordance with an embodiment of the present invention.

FIG. 13 shows multiple cutting units 1200 & 1200' latched together. Multiple cutting units or apparatuses are useful when there is a need for additional capacity or a need for different input materials for example, for plastic, clothing or cardboard.

Figure 14:
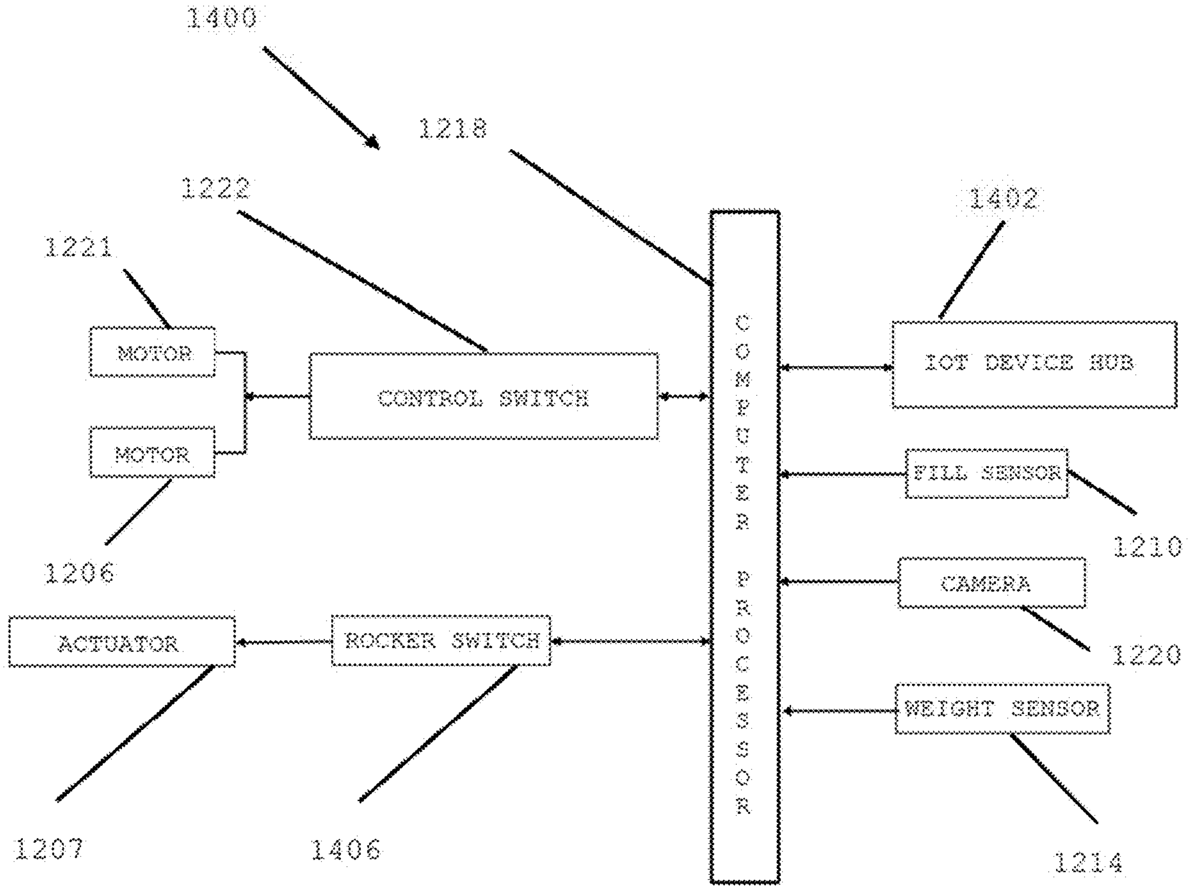
FIG. 14 shows a circuit layout diagram of on-board sensors/electronics, in accordance with an embodiment of the present invention.

FIG. 14 shows the sketch of all the onboard electronics and the sensors connected to the device. FIG. 14 shows simplified representations for two AC motors 1206 and 1221 of device 1200 also shown in FIG. 12. The motors will be synchronized to run at the same speed and controlled by the three-speed motor control switch 1222 in device 1200 in FIG. 12. In the semi-automated configuration, the speed control switch 1410 position will be read out via the on-board microcontroller 1218 on device 1200 FIG. 12. In the fully automated mode 1410 will be a programmable motion/speed controller for controlling the speed of the motors 1408 & 1409 with ability to remote control, The linear actuator 1407 which is also shown as 1207 shown in the device 1200 FIG. 12. In the semi-automated configuration, the rocker switch will be position controlled by a rocker switch 1406 which will be connected to the on-board micro controller 1218 for the position readout. In the fully automated mode 1406 will be a programmable motion/speed controller for controlling the speed of the motors 1206 and 1221 with ability to remote control. Fill sensor 1210 also shown in FIG. 12 provides an indication of height of material, and thus amount of material in recycle bin 1213. A weight sensor 1214, also shown in FIG. 12 will be attached on the floor of base unit 1215 to measure the weight of the discarded materials. A camera 1220, also shown in FIG. 12, will be fixed on to the base header 1209 of device 1200 as in FIG. 12 determines the quality and type of materials disposed for further analysis. The on-board microcontroller 1218 as shown also on device 1200 FIG. 12 will be attached to the 1209, the base header of device 1200 as in FIG. 12. The on-board microcontroller 1218 will typically be a Wi-Fi connected device connected to weight sensor 1214, camera 1220 and fill sensor 1210 with the ability to read out and/or supply output to IOT device hub 1402.

In at least one embodiment, one or more apparatuses of the present invention provide the ability to shred/chip/fragment recyclable household consumer plastics/cloths or cardboard materials into pieces of two square inches or less. One or more embodiments of the present invention aim to reduce the overall size of the materials and increase the amount that will fit into a recycling bin.

One or more apparatuses of the present invention will be easily configurable with multiple speed and gap settings to adjust for different input material processing, will be available in multiple configurations with necessary safety features to be installed either at home or office/small business.

One or more apparatuses of the present invention will typically have multiple sensors, such as including fill sensor (such as fill sensor 1210) that measures fill of the recycle bin, a weight sensor, such as weight sensor 1214, that measures weight of the material inclusive of the recycle bin, such as recycle bin 1213, a Wi-Fi camera, such as camera 1220, that measures the size and quality of the material being processed.

One or more apparatuses of one or more embodiments of the present invention will typically enable and enforce cleaner recycling processes at the source i.e. both residential and commercial establishments while assisting and augmenting the existing recycling processes. This will improve the current messed up human trash disposal habits and decrease the mix up of recyclable and non-recyclable materials. It will also decrease the manual human intervention of separating those at the recycling plants and decrease the current amount of plastic ending up in the landfills.

One or more embodiments of the present invention aim to create a process to ratify the quality of the processed material and to monetize it, thereby creating a cleaner sustainable recycling system to process discarded materials and decrease a portion of the human-caused environmental impact.

In at least one embodiment, a fill sensor 1210 is configured to measure a height of fill of shredded material in a recycle bin, such as in recycle bin 1213 shown in FIG. 12. The height of shredded material in bin 1213 determined by fill sensor 1210 provides an indicator of when the recycle bin 1213 needs to be emptied out and the frequency at which it is emptied out. In at least one embodiment, data from fill sensor 1210 is transmitted to IOT (internet of things) device hub 1402, such as wirelessly to be sent to a "cloud", which typically may be a distributed group of computer servers that host computer software and computer infrastructure and is typically accessed over the Internet. The fill sensor 1210 is configured in at least one embodiment to communicate with computer processor and/or microcontroller 1218. In at least one embodiment, this provides real time synchronization for pickup of a recycling bin, such as recycling bin 1213 by a recycling company.

Somewhat similarly, in at least one embodiment, data from a weight sensor, such as weight sensor 1214 is configured to measure a weight of fill of shredded material in a recycle bin, such as in recycle bin 1213 shown in FIG. 12. The weight of shredded material in bin 1213 determined by fill sensor 1210 provides an indicator of when the recycle bin 1213 needs to be emptied out and the frequency at which it is emptied out. In at least one embodiment, data from weight sensor 1214 is transmitted to IOT (internet of things) device hub 1402, such as wirelessly to be sent to a "cloud", which typically may be a distributed group of computer servers that host computer software and computer infrastructure and is typically accessed over the Internet. The weight sensor 1214 is configured in at least one embodiment to communicate with computer processor and/or microcontroller 1218. In at least one embodiment, this provides real time synchronization for pickup of a recycling bin, such as recycling bin 1213 by a recycling company.

The data, such as indication of weight of shredded materials, from weight sensor 1214 is also configured to be used by computer processor and/or microcontroller 1218 to determine the quality of the shredded materials in bin 1213.

In at least one embodiment, data, such as images from a camera, such as camera 1220 is configured to be provided to computer processor and/or micro controller 1218 to provide indication of type and quality of shredded materials in a recycle bin, such as in bin 1213. The images and/or data from camera 1220, in at least one embodiment are also transmitted to IOT (internet of things) device hub 1402, such as wirelessly to be sent to a "cloud". The camera 1220 is configured in at least one embodiment to communicate with computer processor and/or microcontroller 1218. In at least one embodiment, this provides real time synchronization for determination of type of material.

In at least one embodiment, the onboard microcontroller and/or computer processor 1218 is connected by communications links, such as hardwired and/or wireless links with all sensors/devices for both programmatic control and readout, including camera 1220, AC (alternating current) motor 1206, linear actuator 1207, AC motor 1221, the three-speed motor control switch 1222, IOT (internet of things) device hub 1402, fill sensor 1210, and the weight sensor 1214

The microcontroller and/or computer processor 1218 shown in FIG. 14, in at least one embodiment, may be connected and in communication with additional sensors.

In at least one embodiment, the IOT device hub 1402 may be an IOT platform, and/or may provide computer software applications for the computer processor 1218 to control and management of devices, and for readout data collection, processing for further analytics and decision making.

Although the invention has been described by reference to illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method for recycling materials comprising:

shredding a first material into a first shredded material using an apparatus; and shredding the first shredded material into a second shredded material using the apparatus;

wherein the apparatus includes:

a housing;

a first level including a first roller cutter and a second roller cutter; and a second level including at first roller cutter and a second roller cutter; and a recycle bin;

wherein the first roller cutter of the first level includes a plurality of cutting blades;

wherein the second roller cutter of the first level includes a plurality of cutting blades;

wherein the first roller cutter of the second level includes a plurality of cutting blades;

wherein the second roller cutter of the second level includes a plurality of cutting blades;

wherein each of the plurality of cutting blades of the first roller cutter of the first level is at a first angle with respect to the housing;

wherein each of the plurality of cutting blades of the second roller cutter of the first level is at the first angle with respect to the housing;

wherein each of the plurality of cutting blades of the first roller cutter of the second level is at a second angle with respect to the housing;

wherein each of the plurality of cutting blades of the second roller cutter of the second level is at the second angle with respect to the housing;

wherein the first and second angle are different;

and wherein the first level and the second level are fixed to the housing so that a first material travels into the first level and is shredded by the first level forming a first shredded material, and then the first shredded material next proceeds to the second level, and is shredded by the second level to form a second shredded material;

wherein the recycle bin is fixed to the housing so that the second shredded material falls into the recycle bin;

wherein the first material falls is shredded to form the first shredded material by falling between the plurality of cutting blades of the first roller cutter of the first level and the plurality of cutting blades of the second roller cutter of the first level;

wherein the plurality of cutting blades of the first roller cutter of the first level are directly opposed to the plurality of cutting blades of the second roller cutter of the first level;

wherein the first shredded material is shredded to form the second shredded material by falling between the plurality of cutting blades of the first roller cutter of the second level and the plurality of cutting blades of the second roller cutter of the second level; and wherein the plurality of cutting blades of the first roller cutter of the first level are directly opposed to the plurality of cutting blades of the second roller cutter of the first level;

and further comprising rolling the recycle bin onto a floor of the housing prior to shredding the first material into the first shredded material using the apparatus and prior to shredding the first shredded material into the second shredded material using the apparatus;

wherein the apparatus is configured so that the recycle bin is configured to be rolled onto the floor of the housing so that the recycle bin is underneath both the first level, including the first roller cutter and the second roller cutter of the first level, and the second level, including the first roller cutter and the second roller cutter of the second level; and wherein the recycle bin has wheels on a first side, and wheels on an opposing second side; and wherein the apparatus is configured so that the recycle bin is configured to be rolled onto the floor of the housing to cause a weight sensor fixed to the floor of the housing to be entirely located between the first side wheels of the recycle bin, and the second side wheels of the recycle bin;

further comprising measuring a height of the second shredded material in the recycle bin using a fill sensor;

measuring a weight of a combination of the recycle bin and second shredded material using the weight sensor;

capturing images of the second shredded material to determine its quality with a camera positioned outside the recycle bin, between the second level and an opening slot leading to the recycle bin, receiving data concerning the height and weight of the shredded material at a computer processor via a communications link;

providing real-time synchronization for pickup of the recycle bin based on height measured by the fill sensor and weight measured by the weight sensor via communication by the computer processor and an internet of things (IOT) device hub;

receiving image data from the camera at the computer processor to determine the quality of the second shredded material; and wherein the apparatus includes latching means for latching the apparatus side by side with a further apparatus which is substantially the same as the apparatus.

* * * * *